(12) United States Patent
Schwarz et al.

(10) Patent No.: US 11,585,276 B2
(45) Date of Patent: Feb. 21, 2023

(54) GAS TURBINE ENGINE WITH HIGH SPEED LOW PRESSURE TURBINE SECTION AND BEARING SUPPORT FEATURES

(71) Applicant: United Technologies Corporation, Farmington, CT (US)

(72) Inventors: Frederick M. Schwarz, Glastonbury, CT (US); Daniel Bernard Kupratis, Wallingford, CT (US); Brian D. Merry, Andover, CT (US); Gabriel L. Suciu, Glastonbury, CT (US); William K. Ackermann, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/598,048

(22) Filed: Oct. 10, 2019

(65) Prior Publication Data
US 2020/0049077 A1 Feb. 13, 2020

Related U.S. Application Data (63) Continuation of application No. 15/399,864, filed on Jan. 6, 2017, now abandoned, which is a continuation
(Continued)

(51) Int. Cl.
*F02C 7/36* (2006.01)
*F02K 3/06* (2006.01)
(Continued)

(52) U.S. Cl.
CPC .................. *F02C 7/36* (2013.01); *F01D 5/06* (2013.01); *F01D 25/162* (2013.01); *F02C 3/06* (2013.01);
(Continued)

(58) Field of Classification Search
CPC ...... F02C 7/36; F02C 7/06; F02C 7/20; F02C 3/107; F01D 25/162; F05D 2260/40311
See application file for complete search history.

(56) References Cited

U.S. PATENT DOCUMENTS

| | | | |
|---|---|---|---|
| 2,258,792 A | 4/1941 | New | |
| 2,608,821 A * | 9/1952 | Hunsaker | ............... F02C 3/067 60/268 |

(Continued)

FOREIGN PATENT DOCUMENTS

| | | |
|---|---|---|
| EP | 0791383 | 8/1997 |
| EP | 1142850 | 10/2001 |

(Continued)

OTHER PUBLICATIONS

Sabnis, Winkler, "The PW1000G Pure Power New Engine Concept and its impacton MRO" Dec. 1, 2010 (Year: 2010).*
(Continued)

*Primary Examiner* — Steven M Sutherland
(74) *Attorney, Agent, or Firm* — Carlson, Gaskey & Olds, P.C.

(57) ABSTRACT

A gas turbine engine includes a very high speed low pressure turbine such that a quantity defined by the exit area of the low pressure turbine multiplied by the square of the low pressure turbine rotational speed compared to the same parameters for the high pressure turbine is at a ratio between about 0.5 and about 1.5. The high pressure turbine is supported by a bearing positioned at a point where the first shaft connects to a hub carrying turbine rotors associated with the second turbine section.

27 Claims, 2 Drawing Sheets

Related U.S. Application Data of application No. 13/558,605, filed on Jul. 26, 2012, now Pat. No. 9,540,948, which is a continuation of application No. 13/455,235, filed on Apr. 25, 2012, now abandoned, which is a continuation-in-part of application No. 13/363,154, filed on Jan. 31, 2012, now abandoned.

(51) Int. Cl.
 F02C 3/107 (2006.01)
 F01D 25/16 (2006.01)
 F01D 5/06 (2006.01)
 F02C 3/06 (2006.01)
 F02C 7/06 (2006.01)
 F04D 29/32 (2006.01)

(52) U.S. Cl.
 CPC .............. F02C 3/107 (2013.01); F02C 7/06 (2013.01); F02K 3/06 (2013.01); F04D 29/321 (2013.01); F04D 29/325 (2013.01); F05D 2220/32 (2013.01); F05D 2240/35 (2013.01); F05D 2240/60 (2013.01); F05D 2260/40311 (2013.01)

(56) References Cited

U.S. PATENT DOCUMENTS

| | | | |
|---|---|---|---|
| 2,936,655 A | 5/1960 | Peterson et al. |
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,861,139 A | 1/1975 | Jones |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,220,171 A | 9/1980 | Ruehr |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,693,616 A | 9/1987 | Rohra et al. |
| 4,696,156 A | 9/1987 | Burr et al. |
| 4,722,357 A | 2/1988 | Wynosky |
| 4,809,498 A | 3/1989 | Giffin, III et al. |
| 4,827,712 A | 5/1989 | Coplin |
| 4,916,894 A | 4/1990 | Adamson et al. |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,506,022 B2 | 1/2003 | Bunker |
| 6,517,341 B1 | 2/2003 | Brun et al. |
| 6,607,165 B1 | 8/2003 | Manteiga et al. |
| 6,619,030 B1 | 9/2003 | Seda et al. |
| 6,647,707 B2 | 11/2003 | Dev |
| 6,709,492 B1 | 3/2004 | Spadaccini et al. |
| 6,814,541 B2 | 11/2004 | Evans et al. |
| 6,883,303 B1 | 4/2005 | Seda |
| 7,021,042 B2 | 4/2006 | Law |
| 7,219,490 B2 | 1/2007 | Dev |
| 7,328,580 B2 | 2/2008 | Lee et al. |
| 7,374,403 B2 | 5/2008 | Decker et al. |
| 7,451,592 B2 | 11/2008 | Taylor et al. |
| 7,591,754 B2 | 9/2009 | Duong et al. |
| 7,600,370 B2 | 10/2009 | Dawson |
| 7,632,064 B2 | 12/2009 | Somanath |
| 7,662,059 B2 | 2/2010 | McCune |
| 7,685,808 B2 * | 3/2010 | Orlando .................. F02C 7/36 60/268 |
| 7,694,505 B2 | 4/2010 | Schilling |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,997,868 B1 | 8/2011 | Liang et al. |
| 8,061,969 B2 | 11/2011 | Durocher et al. |
| 8,091,371 B2 | 1/2012 | Durocher et al. |
| 8,205,432 B2 | 6/2012 | Sheridan |
| 8,297,916 B1 | 10/2012 | McCune et al. |
| 8,297,917 B1 | 10/2012 | McCune et al. |
| 9,133,729 B1 | 9/2015 | McCune et al. |
| 9,631,558 B2 | 4/2017 | McCune et al. |
| 2003/0163983 A1 | 9/2003 | Seda et al. |
| 2003/0163984 A1 | 9/2003 | Seda et al. |
| 2006/0228206 A1 | 10/2006 | Decker et al. |
| 2006/0236675 A1 | 10/2006 | Weiler |
| 2007/0265133 A1 | 11/2007 | Smook |
| 2008/0003096 A1 | 1/2008 | Kohli et al. |
| 2008/0098714 A1 | 5/2008 | Orlando et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0229242 A1 | 9/2009 | Schwark |
| 2009/0304518 A1 | 12/2009 | Kodama et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0081237 A1 | 4/2011 | Durocher et al. |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0291449 A1 | 11/2012 | Adams |
| 2013/0192201 A1 | 8/2013 | Kupratis et al. |
| 2013/0192258 A1 | 8/2013 | Kupratis et al. |
| 2013/0195621 A1 | 8/2013 | Schwarz et al. |
| 2013/0287575 A1 | 10/2013 | McCune et al. |
| 2014/0020404 A1 | 1/2014 | Sheridan et al. |
| 2015/0121844 A1 | 5/2015 | Kupratis et al. |
| 2016/0032826 A1 | 2/2016 | Rued |

FOREIGN PATENT DOCUMENTS

| | | |
|---|---|---|
| EP | 1703085 | 9/2006 |
| EP | 2071139 A2 | 6/2009 |
| EP | 2532841 | 12/2012 |
| EP | 2532858 | 12/2012 |
| EP | 2551489 | 1/2013 |
| EP | 2809931 | 7/2016 |
| FR | 2563865 A1 | 11/1985 |
| GB | 1516041 | 6/1978 |
| GB | 2041090 | 9/1980 |
| GB | 2426792 | 12/2006 |

(56) References Cited

FOREIGN PATENT DOCUMENTS

| | | |
|---|---|---|
| WO | 2007038674 | 4/2007 |
| WO | 2013116262 | 8/2013 |
| WO | 2014047040 | 3/2014 |

OTHER PUBLICATIONS

Aviation Investigation Report A14Q0068, Transportation Safety Board of Canada, May 2014 (Year: 2014).*
Type Certificate Data Sheet for PW1500G Series Engines, EASA, 2021 (Year: 2021).*
Anderson, R.D. (1985). Advanced Propfan Engine Technology (APET) definition study, single and counter-rotation gearbox/pitch change mechanism design. NASA CR-168115. Jul. 1, 1985. pp. 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA DR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Technical Report. (1975). Quiet Clean Short-haul Experimental Engine (QCSEE) UTW fan preliminary design. NASA-CR-134842. Feb. 1, 1975. pp. 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/DR-2003-212309. May 2003. pp. 1-52.
Decision Revoking the European Patent 2811120 mailed Jan. 15, 2020.
Summons to attend oral proceedings for European Patent Application No. 13777804.9 mail Jul. 7, 2020.
Third Party Observations of European Patent Application No. 2809940 mailed Mar. 30, 2020 by Rolls Royce.
Petition for Inter Partes Review of U.S. Pat. No. 8,297,916. *General Electric Company, Petitioner*, v. *United Technologies Corporation, Patent Owner.* IPR2018-01172. Filed May 30, 2018.
Notice of Opposition to Patent No. EP2949882. United Technologies Corporation opposed by Rolls Royce mailed May 22, 2018.
Notice of Opposition to Patent No. EP299882. United Technologies Corporation opposed by Safran Aircraft Engines mailed May 23, 2018.
Summons to Attend Oral Proceedings for European Patent Application No. 13822569.3 (2841718) mailed Oct. 23, 2019.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About Gas Turb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives, lexandria, VA: American Gear Manufacturers Association. pp. 1-48.
Daly, M. Ed. (2007). Jane's Aero-Engine. Issue Twenty-three. Mar. 2008. p. 707-12.

(56) References Cited

OTHER PUBLICATIONS

AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_slirtness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C, and Wynosky, T.A. (1985). Energy efficient engine program advanced turbofan nacelle definition study. NASA-CR-174942. May 1985. pp. 1-60.
Howe, D.C, and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D, Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis, pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

(56) References Cited

OTHER PUBLICATIONS

U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society, pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-49.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press, pp. 215-219 and 855-860.
Bunker, R.S. (2005). A review of shaped hole turbine film-cooling technology. Journal of Heat Transfer vol. 127. Apr. 2005. pp. 441-453.
Response to Statement of Grounds of Appeal from the Patent Holder for European Patent No. 2809931 by Safran Aircraft Engine dated Aug. 21, 2019.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

(56) References Cited

OTHER PUBLICATIONS

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006). Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report Prepared for NASA. NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-1 59594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CATC). Chapter 79: Lubrciation System. TTFE731 Issue 2. 2010. pp. 1-24.
Mcardle, J.G. (1979). Static test-stand performance of the YF-102 turbofan engine with several exhaust configurations for the quiet short-haul research aircraft (QSRA). NASA Technical Paper. Nov. 1979. pp. 1-68.
Declaration of Dr. Magdy Attia. In re U.S. Pat. No. 9,695,751. Executed Jul. 12, 2018. pp. 1-135.

(56) References Cited

OTHER PUBLICATIONS

Principal Brief. *Raytheon Technologies Corporation v. General Electric Company*. Inter Partes Review No. IPR2018-01442. Filed Aug. 7, 2020.
Brief for Appellee. *Raytheon Technologies Corporation v. General Electric Company*. Inter Partes Review No. IPR2018-01442. Filed Sep. 23, 2020.
Appellant's Reply Brief. *Raytheon Technologies Corporation v. General Electric Company*. Inter Partes Review No. IPR2018-01442. Filed Oct. 26, 2020.
European Search Report for EP Application No. 20162850.0 dated Aug. 18, 2020.
Decision of the Opposition Division for European Patent No. 2811120 (14155460.0) mailed Jan. 15, 2020.
Third Party Observations of European Patent Application No. 18191325.2 (EP 3608515) mailed Mar. 10, 2020 by Rolls Royce.
Third Party Observations of European Patent Application No. 18191325.2 (EP 3608515) mailed Mar. 6, 2020 by Rolls Royce.
Third Party Observations of European Patent Application No. 18191333.6 (EP 3467273) mailed Mar. 9, 2020 by Rolls Royce.
Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.
(1987). Wide-chord fan—12 years of development. Aircraft Engineering and Aerospace Technology, vol. 59, issue 7. pp. 10-11 Retrieved Jul. 31, 2008 from: https://doi.org/10.1108/eb036471.
Mcmillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida, pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003) Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, DC.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.

(56) References Cited

OTHER PUBLICATIONS

Rolls-Royce M45H. Jane's Aero-engines, Aero-engines—Turbofan. Feb. 24, 2010.
Brief Communication from Opponent after Oral Proceedings for European Patent Application No. 13743283.7 (2809932) by Safran Aircraft Engines dated Dec. 2, 2019.
Third Party Observations for European Patent Application No. 13777804.9 (2809940) by Rolls-Royce dated Nov. 21, 2019.
Summons to Attend Oral Proceedings for European Patent Application No. 13778330.4 (2809922) dated Dec. 2, 2019.
Summons to Attend Oral Proceedings for European Patent Application No. 13777804.9 dated Dec. 10, 2019.
Response to the Summons of Oral Proceedings for European Patent No. 3051078 by Rolls-Royce dated Oct. 17, 2019.
Response to the Summons of Oral Proceedings for European Patent No. 2949882 by Rolls-Royce dated Oct. 9, 2019.
Response to the Summons of Oral Proceedings for European Patent No. 2949882 by Safran dated Oct. 9, 2019.
Welch, G.E. (2010). Assessment of aerodynamic challenges of a variable-speed power turbine for large civil tilt-rotor application. Prepared for 66th Annual Forum and Technology Display. May 11-13, 2010. NASA/TM-2010-216758.
Welch, G.E., Mcvetta, A.B., Stevens, M.A., Howard, S.A., Giel, P.W., Ameri, A.A., To, W., et al. (2012). Variable-speed power-turbine research at Glenn Research Center. Prepared for the 68th Annual Forum and Technology Display. May 1-3, 2012. NASA/TM-2012-217605.
Smith, Jr., M.G., Champagne, G.A., (1991). P&W propulsion systems studies results/status. National Aeronautics and Space Administration First Annual High Speed Research Workshop. May 14-16, 1991. pp. 921-948.
Hendricks, E.S., Jones, S.M., and Gray, U.S. (2014). Design optimization of a variable-speed power-turbine. American Institute of Aeronautics and Astronautics. pp. 1-17.
Suchezky, M., and Cruzen, G.S. (2012). Variable-speed power-turbine for the large civil tilt rotor. Prepared for NASA. NASA/CR-2012-217424. Feb. 2012. pp. 1-89.
Bijewitz, J., Seitz, A., Hornung, M., and Luftfahrt, B. (2014). Architectural comparison of advanced ultra-high bypass ratio turbofans for medium to long range application. Deutscher Luft-und Raumfahrtkongress 2014. pp. 1-2.
Prior Art Direct Drive Engines.
Mattingly, et al., Aircraft engine Design 2nd Ed., American Institute of Aeronautics and Astronautics, Inc., 2002, ISBN 1-56347-538-3, pp. 292-310.
Third Party Observations for European Patent Application No. 13777804.9 dated Dec. 19, 2018.
European Search Report for European Application No. 16195861.6 dated Mar. 20, 2017.
Decision Denying Institution of Inter Partes Review. *General Electric Company.*, Petitioner, v. *United Technologies Corp.*, Patent Owner. IPR2017-00522. U.S. Pat. No. 8,899,915. Entered Jun. 23, 2017. pp. 1-18.
Gardner, W.B. (1979). Energy efficient engine high pressure turbine uncooled rig technology report. Prepared for NASA. NASA-CR-165149. Oct. 1979. pp 1-242.
Gardner, W.B. (1979). Energy efficient engine flight propulsion system preliminary analysis and design report. Prepared for NASA. NASA CR-159487. Apr. 1, 1979. pp. 1-450.
Patent Owner's Preliminary Response. *General Electric Company.*, Petitioner, v. *United Technologies Corp.*, Patent Owner. IPR2017-00522. U.S. Pat. No. 8,899,915. Entered Apr. 19, 2017. pp. 1-54.
Mattingly, J.D. (1996). Elements of gas turbine propulsion. New York, New York: McGraw-Hill, Inc. preface, pp. 719-720, 727-731, 735-738, 928-929, and 936-937.
Red Aviation. Part or Material Certification Form for various engine components. Dated Apr. 5, 2017.

Rethinking jet engines to make commercial aviation less of a threat to the climate (and the human respiratory system). Fortune. Retrieved Sep. 29, 2016 from: http://beta.fortune.com/change-the-world/united-technologies-8.
Krauskopf, L. and Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.
Grose, T.K. (2013). Reshaping flight for fuel efficiency: Five technologies on the runway. National Geographic. Retrieved Mar. 16, 2016 from: http://news.nationalgeographic.com/news/energy/2013/04/130423-reshaping-flight-for-fuel-efficiency.html.
Request for Opinion as to Validity for European Patent No. 2809922 (13778330.4) by Rolls Royce dated Feb. 6, 2019.
Annotation of Edkins, D.P., Hirschkron, R., and Lee, R. (1972). TF34 turbofan quiet engine study. Final Report prepared for NASA. NASA-CR-120914. Jan. 1, 1972. p. 92.
Annotation of Gray, D.E. (1978). Energy efficient engine preliminary design and integration studies. Prepared for NASA. NASA CR-135396. Nov. 1978. p. 70.
Decision Institution of Inter Partes Review. *General Electric Company.*, Petitioner, v. *United Technologies Corp.*, Patent Owner. IPR2018 01442. U.S. Pat. No. 9,695,751. Entered Feb. 21, 2019. p. 1 25.
Opinion under Section 74(a) for European Patent Application No. 2809922 dated May 9, 2019.
Statement of Appeal filed Mar. 22, 2019 by Safran in European Patent 2809931 (13743042.7).
Decision of the Opposition Division. European Patent No. 2949882 mailed Nov. 26, 2018.
Product Brochure. The ALF 502R turbofan: technology, ecology, economy. Avco Lycoming TEXTRON.
Attestation of Philippe Pellier signed Apr. 12, 2017.
Annex to the Notice un Article 94(3) EPC issued by the Examination Division. European Patent Application No. 13837107.5 dated Jan. 25, 2019.
Holder's Response to Written Opinion dated Sep. 29, 2015. European Patent Application No. 15175205.2 (2949882) dated Jun. 1, 2016.
Notice of Opposition of European Patent No. 2834469 mailed Mar. 27, 2019 by Safran Aircraft Engines.
Rolls-Royce Trent 900. Jane's Aero-Engines. Jane's by IHS Markit. Feb. 8, 2012.
Rolls-Royce Trent XWB. Jane's Aero-Engines. Jane's by IHS Markit. Mar. 6, 2012.
The jet engine. Rolls-Royce plc. 5th Edition. 1996.
Gas turbine technology: Introduction to a jet engine. Rolls-Royce plc. Dec. 2007.
Bradley, A. (2010). Presentation: Engine design for the environment. Rolls-Royce. RAeS—Hamburg. Jun. 24, 2010.
Response to Holder's Response. European Patent No. 2949882 dated Mar. 12, 2019 by Safran Aircraft Engines.
Notice of Opposition of European Patent No. 2949881 mailed May 28, 2019 by Safran Aircraft Engines.
Notice of Opposition of European Patent No. 2949881 mailed May 28, 2019 by Rolls-Royce.
Summons to Attend Oral Proceedings for European Patent Application No. 13743283.7 dated May 28, 2019.
European Search Report for European Application No. 16196567.8 dated Mar. 17, 2017.
Sabnis, J.S. (2005). Emissions and noise: Next frontier for aircraft engine technologies. Presented at the AIAA/AAAF Aircraft Noise and Emissions Reduction Symposium. Monterey, CA. May 24-26, 2005. pp. 1-36.
Petition for Inter Partes Review of U.S. Pat. No. 8,899,915. *General Electric Company*, Petitioner, v. *United Technologies Corporation*, Patent Owner. Filed Dec. 21, 2016.
Declaration of Raymond Drago. In re U.S. Pat. No. 8,899,915 under 37 C.F.R. § 1.68. Executed Dec. 9, 2016. pp. 1-38.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.

(56) References Cited

OTHER PUBLICATIONS

English translation of Measurement and calculation methodology on TFE731-2, TFE731-3A and TFE731-3D models.
Declaration of Raymond Drago. In re U.S. Pat. No. 8,297,916. IPR2018-01172. Executed May 29, 2018. pp. 1-115.
Declaration of Courtney H. Bailey. In re U.S. Pat. No. 8,511,605. Executed Jul. 19, 2016. pp. 1-4.
Notice of Opposition to Patent No. EP2811120. United Technologies Corporation opposed by Rolls Royce. Issued on Apr. 12, 2018.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Letter from the Opponent (Safran) for European Patent 2949881 (15175203.74) dated Mar. 25, 2021.
*Raytheon Techs. Corp. V. General Electric Co.*, 993 F.3d 1374 (Fed. Cir. 2021).
Letter from the Opponent (Safran) for European Patent 2809939 (13786893.1) dated Aug. 13, 2020.
Attestation for Didier Escure Signed Sep. 17, 2018, cited in: Notice of Opposition for European Patent No. 2809932 mailed Oct. 1, 2018.
Boards of Appeal of the European Patent Office for European Patent Application No. 01992470.3, Sep. 27, 2016, 17 pages.
Decision of the Opposition Division, European Patent No. 2809931 dated Nov. 26, 2018.
*Dr. Raymond G. Tronzo v. Biomet Inc.*, 156 F.3d 1154, 1998, 10 pages.
English Translation of EXPERT Certificate Concerning the Technical Nature of the Drawings used in the Measurement and Calculation Methodology.
Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.
Lacaze J., et al., "Directionally Solidified Materials: Nickel-Base Superalloys for Gas Turbines," Textures and Microstructures, 1990, vol. 13, pp. 1-14.
Letter from the Opponent for European Patent Application No. 2811120 (14155460.0) mailed Feb. 15, 2019 by Safran Aircraft Engines.
Mattingly J.D., "Aircraft Engine Design," American Institute of Aeronautics and Astronautics Inc, 2nd Edition, Jan. 2002, pp. 292-321.
Notice of Opposition by Rolls Royce of European Patent No. 2809939 (European Patent Application No. 13786893.1) dated Sep. 26, 2018, 30 pages.
Notice of Opposition for European Patent No. 2809922 (13778330.4) dated Mar. 18, 2019 by Rolls-Royce pic.
Notice of Opposition for European Patent No. 2809922 (13778330.4) dated Mar. 20, 2019 by Safran Aircraft Engines.
Notice of Opposition of European Patent Application No. EP13786893.1 (European Patent No. 2809939) by Safran Aircraft Engines dated Sep. 24, 2018, 177 pages.
Notice of Opposition of European Patent No. 2811120 (14155460.0) mailed Apr. 12, 2018 by Safran Aircraft Engines.
Praisner T.J. et al., "Predictions of unsteady interactions between closely coupled HP and LP turbines with co-and counter-rotation", Proceedings of ASME Turbo Expo 2010, Jun. 14-18, 2018. Glasgow, UK. pp. 1-10.
Pratt & Whitney PW8000, "Jane's Aero-Engines", Jane's by IHS Markit, Sep. 30, 2010, 7 pages.
Request for Opinion as to Validity for European Patent No. EP2809922 (13778330.4) by Rolls Royce dated Feb. 14, 2019.
Response from the Holder. European Patent Application No. 14155460.0 (2811120) dated Nov. 23, 2015.
Response from the Holder. European Patent Application No. 14155460.0 (2811120) dated Dec. 1, 2016.
Response from the Holder. European Patent Application No. 14155460.0 (2811120) dated Jun. 10, 2015.
Roux E., "Turbofan and turbojet engines database handbook," Editions Elodie Roux, Blagnac: France, 2007, pp. 41-43 and 464-469.
Roux E., "Turbofan and turbojet engines database handbook", Editions Elodie Roux. Blagnac: France, 2007, pp. 41-42, p. 465, pp. 468-469.
Schaber Reinhold, "Numerische Auslegung und Simulation von Gasturbinen," Dec. 14, 2000.
Third Party Observation submitted for EP Application No. EP16156289.7 (Patent No. EP3059393), by Rolls Royce dated Jun. 19, 2019, 5 pages.
Third Party Observations and Concise Description of Relevance of Document for U.S. Appl. No. 15/881,240, dated Aug. 31, 2018, 38 pages.
Third Party Observations for EP Application No. EP113854452.3 by Rolls Royce dated Dec. 13, 2018, mailed Jan. 2, 2019, 9 pages.
Third Party Observations for EP Application No. EP13743282.9 (EP2809953) by Rolls-Royce dated Dec. 13, 2018, 8 pages.
Third Party Observations for EP Application No. EP13743282.9 (EP2809953) by Rolls-Royce dated Sep. 20, 2018, 10 pages.
Third Party Observations for EP Application No. EP13775036.0 by Rolls Royce dated Dec. 13, 2018, mailed Jan. 2, 2019, 7 pages.
Third Party Observations for EP Application No. EP13775036.0 by Rolls Royce dated Oct. 11, 2018, mailed Oct. 17, 2018, 6 pages.
Third Party Observations for EP Application No. EP13775188.9 by Rolls Royce dated Dec. 13, 2018, mailed Jan. 2, 2019, 7 pages.
Third Party Observations for EP Application No. EP13775188.9 by Rolls Royce dated Sep. 10, 2018, mailed Sep. 17, 2018, 7 pages.
Third Party Observations for EP Application No. EP13822569.3 (EP2841718) dated Dec. 13, 2018, 8 pages.
Third Party Observations for EP Application No. EP14155460.0 (EP2811120) by Rolls Royce dated Oct. 29, 2018, 6 pages.
U.S. Appl. No. 61/494,453, filed Jun. 8, 2011 titled Geared Engine Flexible Mount Arrangement.
U.S. Department of Transportation: Federal Aviation Administration Type Certificate Data Sheet No. E00064EN. Dated: Nov. 24, 2006, pp. 1-5.
Summons to Attend Oral Proceedings for European Patent Application No. 14155460.0 (2811120) mailed Oct. 15, 2021.
Decision Revoking European Patent EP2809939 (13786893.1) by the Opposition Division mailed Aug. 5, 2021.
Summons to Attend Oral Proceedings in European Patent Application No. 20162850.0 dated Jul. 11, 2022.
Attestation by Didier Escure signed Oct. 20, 2020 as filed in the Opposition of European Patent Application No. 13786893.1 (2809939) by Safran Aircraft Engines dated May 4, 2022.
Reply to Appeal in the opposition of European Patent Application No. 13786893.1 (2809939) by Rolls-Royce plc dated Apr. 21, 2022.
Reply to Appeal in the opposition of European Patent Application No. 13786893.1 (2809939) by Safran dated May 4, 2022.
Decision of Technical Board of Appeal in European Patent Application No. 13743042.7, Appellant Raytheon Technologies Corporation, Appellant Safran Aircraft Engines, mailed Nov. 21, 2022.

* cited by examiner

FIG.3

GAS TURBINE ENGINE WITH HIGH SPEED LOW PRESSURE TURBINE SECTION AND BEARING SUPPORT FEATURES

CROSS-REFERENCE TO RELATED APPLICATION

This application is a continuation of U.S. patent application Ser. No. 15/399,864, filed on Jan. 6, 2017, which is a continuation of U.S. patent application Ser. No. 13/558,605, filed on Jul. 26, 2012, which is a continuation of U.S. patent application Ser. No. 13/455,235, filed on Apr. 25, 2012, which is a continuation-in-part of U.S. patent application Ser. No. 13/363,154, filed on Jan. 31, 2012.

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan.

SUMMARY

In a featured embodiment, a turbine section of a gas turbine engine has a fan drive turbine section and a second turbine section. The fan drive turbine section has a first exit area at a first exit point and is configured to rotate at a first speed. The second turbine section has a second exit area at a second exit point and is configured to rotate at a second speed, which is faster than the first speed. A first performance quantity is defined as the product of the fan drive turbine's speed squared and the fan drive turbine's exit area. A second performance quantity is defined as the product of the second speed squared and the second area. A ratio of the first performance quantity to the second performance quantity is between about 0.5 and about 1.5. The second turbine section drives a shaft which is mounted on a bearing on an outer periphery of the first shaft at a location upstream of a point where the first shaft connects to a hub carrying turbine rotors associated with said second turbine section.

In another embodiment according to the previous embodiment, the ratio is above or equal to about 0.8.

In another embodiment according to any of the previous embodiments, the fan drive turbine section has at least 3 stages.

In another embodiment according to any of the previous embodiments, the fan drive turbine section has up to 6 stages.

In another embodiment according to any of the previous embodiments, the second turbine section has 2 or fewer stages.

In another embodiment according to any of the previous embodiments, a pressure ratio across the first fan drive turbine section is greater than about 5:1.

In another embodiment according to any of the previous embodiments, a second shaft associated with the fan drive turbine is supported by a second bearing at an end of the second shaft, and downstream of the fan drive turbine.

In another embodiment according to any of the previous embodiments, the fan drive turbine and second turbine sections are configured to rotate in opposed directions.

In another embodiment according to any of the previous embodiments, there is no mid-turbine frame positioned intermediate the fan drive turbine and second turbine sections.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. The second turbine section has a second exit area at a second exit point and is configured to rotate at a second speed, which is higher than the first speed. A first performance quantity is defined as the product of the fan drive turbine's speed squared and the fan drive turbine's area. A second performance quantity is defined as the product of the second turbine's speed squared and the second turbine's area. A ratio of the first performance quantity to the second performance quantity is between about 0.5 and about 1.5. The second turbine section drives a shaft which is mounted on a bearing on an outer periphery of the first shaft at a location upstream of a point where the first shaft connects to a hub carrying turbine rotors associated with said second turbine section.

In another embodiment according to the previous embodiment, the ratio is above or equal to about 0.8.

In another embodiment according to any of the previous embodiments, the compressor section includes a first and second compressor sections. The fan drive turbine section and the first compressor section are configured to rotate in a first direction. The second turbine section and the second compressor section and are configured to rotate in a second opposed direction.

In another embodiment according to any of the previous embodiments, a gear reduction is included between the fan and a low spool driven by the fan drive turbine section such that the fan is configured to rotate at a lower speed than the fan drive turbine section.

In another embodiment according to any of the previous embodiments, the fan rotates in the second opposed direction.

In another embodiment according to any of the previous embodiments, a second shaft associated with the fan drive turbine is supported by a second bearing at an end of the second shaft, and downstream of the fan drive turbine.

In another embodiment according to any of the previous embodiments, a third bearing supports the second compressor section on an outer periphery of the first shaft driven by the second turbine section.

In another embodiment according to any of the previous embodiments, a fourth bearing is positioned adjacent the first compressor section, and supports an outer periphery of the second shaft which is configured to rotate with the fan drive turbine section.

In another embodiment according to any of the previous embodiments, there is no mid-turbine frame positioned intermediate the first and second turbine sections.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. A second turbine section has a second exit area at a second exit point and is configured to rotate at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.8 and about 1.5. The compressor section includes first and second compressor sections. The fan drive turbine section and the first compressor section will rotate in a first direction and the second turbine section and the second compressor section will rotate in a second opposed direction. A gear reduction is included between the fan and first compressor section, such that the fan will rotate at a lower speed than the fan drive turbine section, and rotate in the second opposed direction.

In another embodiment according to the previous embodiment, a gear ratio of the gear reduction is greater than about 2.3.

These and other features of this disclosure will be better understood upon reading the following specification and drawings, the following of which is a brief description.

DETAILED DESCRIPTION

Figure 1:
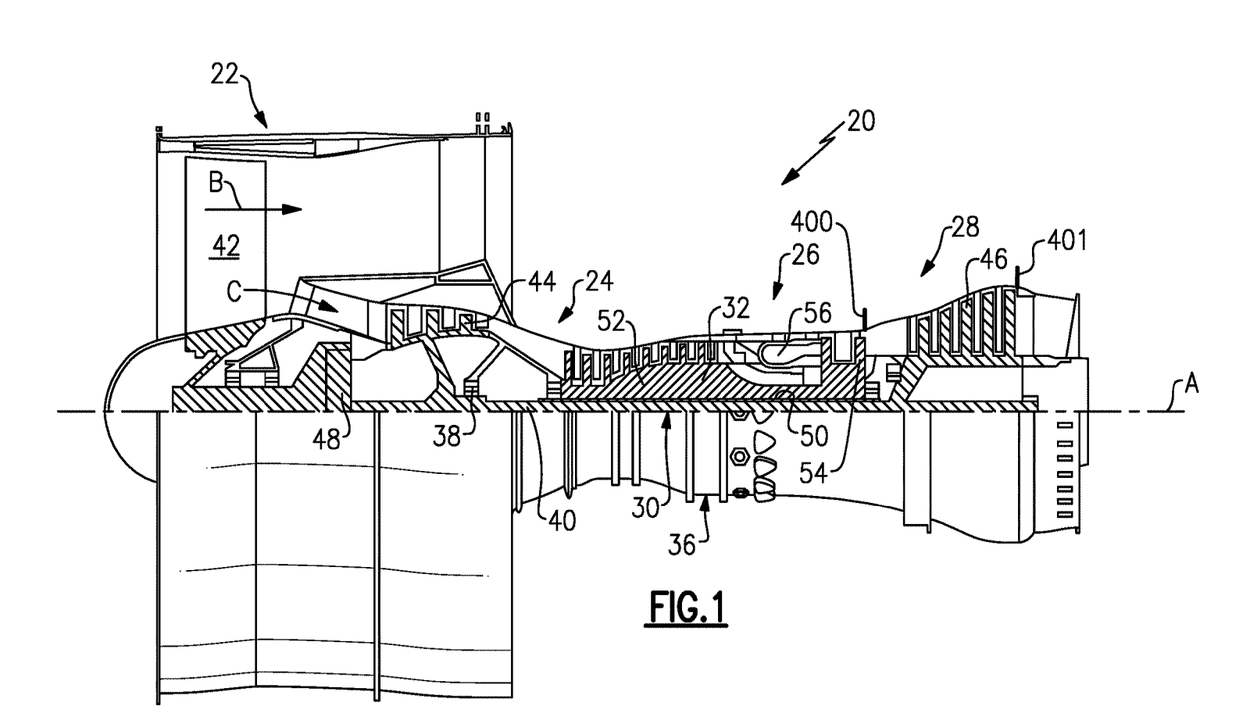
FIG. 1 shows a gas turbine engine.

FIG. 1 schematically illustrates a gas turbine engine 20. The gas turbine engine 20 is disclosed herein as a two-turbine turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-turbine architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an innermost shaft 40 that interconnects a fan 42, a low pressure (or first) compressor section 44 and a low pressure (or first) turbine section 46. Note turbine section 46 will also be known as a fan drive turbine section. The inner shaft 40 is connected to the fan 42 through a geared architecture 48 to drive the fan 42 at a lower speed than the low speed fan drive turbine 46. The high speed spool 32 includes a more outer shaft 50 that interconnects a high pressure (or second) compressor section 52 and high pressure (or second) turbine section 54. A combustor 56 is arranged between the high pressure compressor section 52 and the high pressure turbine section 54. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axis.

The core airflow C is compressed by the low pressure compressor section 44 then the high pressure compressor section 52, mixed and burned with fuel in the combustor 56, then expanded over the high pressure turbine section 54 and low pressure turbine section 46.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a star gear system or other gear system, with a gear reduction ratio of greater than about 2.5:1. It should be understood, however, that the above parameters are only exemplary of one embodiment of a geared architecture engine A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 42 may have 26 or fewer blades.

Figure 2:
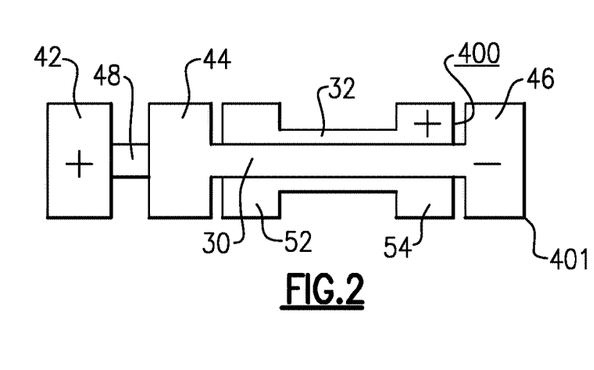
FIG. 2 schematically shows the arrangement of the low and high spool, along with the fan drive.

An exit area 400 is shown, in FIG. 1 and FIG. 2, at the exit location for the high pressure turbine section 54 is the annular area of the last blade of turbine section 54. An exit area for the low pressure turbine section is defined at exit 401 for the low pressure turbine section is the annular area defined by the last blade of that turbine section 46. As shown in FIG. 2, the turbine engine 20 may be counter-rotating. This means that the low pressure turbine section 46 and low pressure compressor section 44 rotate in one direction ("−"), while the high pressure spool 32, including high pressure turbine section 54 and high pressure compressor section 52 rotate in an opposed direction ("+"). The gear reduction 48, which may be, for example, an epicyclic transmission (e.g., with a sun, ring, and star gears), is selected such that the fan 42 rotates in the same direction ("+") as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{ltp}=(A_{lpt} \times V_{lpt}^2) \qquad \text{Equation 1:}$$

$$PQ_{hpt}=(A_{hpt} \times V_{hpt}^2) \qquad \text{Equation 2:}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the high pressure turbine section.

Thus, a ratio of the performance quantity for the low pressure turbine section compared to the performance quantity for the high pressure turbine section is:

$$(A_{lpt} \times V_{lpt}^2)/(A_{hpt} \times V_{hpt}^2)=PQ_{ltp}/PQ_{hpt} \qquad \text{Equation 3:}$$

In one turbine embodiment made according to the above design, the areas of the low and high pressure turbine sections are 557.9 in² and 90.67 in², respectively. Further, the speeds of the low and high pressure turbine sections are 10179 rpm and 24346 rpm, respectively. Thus, using Equations 1 and 2 above, the performance quantities for the low and high pressure turbine sections are:

$$PQ_{ltp}=(A_{lpt} \times V_{lpt}^2)=(557.9 \text{ in}^2) \\ (10179 \text{ rpm})^2=57805157673.9 \text{ in}^2 \text{ rpm}^2 \qquad \text{Equation 1:}$$

$$PQ_{hpt}=(A_{hpt} \times V_{hpt2})=(90.67 \text{ in}^2) \\ (24346 \text{ rpm})^2=53742622009.72 \text{ in}^2 \text{ rpm}^2 \qquad \text{Equation 2:}$$

and using Equation 3 above, the ratio for the low pressure turbine section to the high pressure turbine section is:

$$\text{Ratio}=PQ_{ltp}/PQ_{hpt}=57805157673.9 \text{ in}^2 \text{ rpm}^2/ \\ 53742622009.72 \text{ in}^2 \text{ rpm}^2=1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 are more efficient. Even more narrowly, $PQ_{ltp}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more compression in fewer stages. The low pressure compressor section may be made smaller in radius and shorter in length while contributing more toward achieving the overall pressure ratio design target of the engine.

Figure 3:
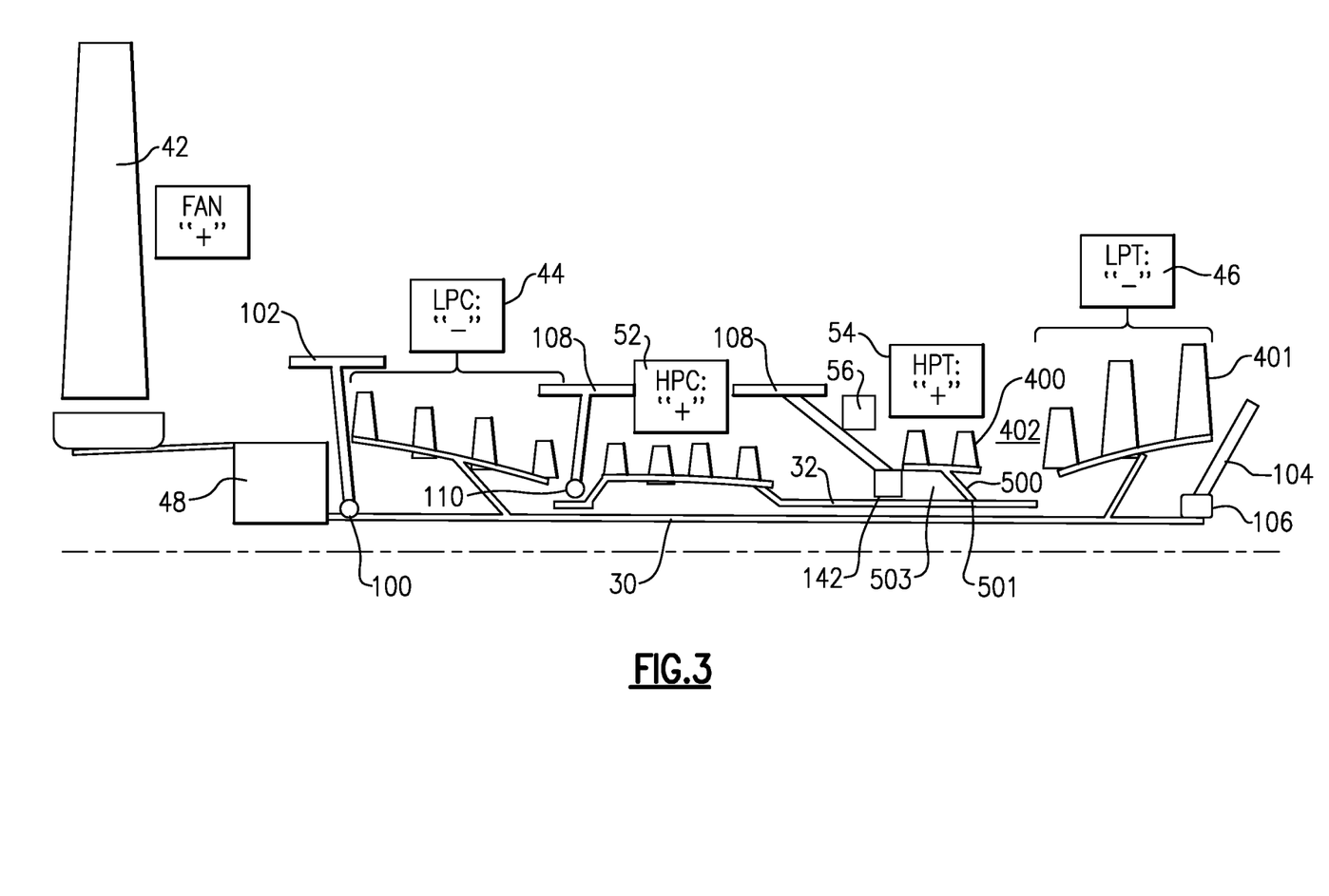
FIG. 3 shows a schematic view of a mount arrangement for an engine such as shown in FIGS. 1 and 2.

As shown in FIG. 3, the engine as shown in FIG. 2 may be mounted such that the high pressure turbine 54 is "overhung" bearing mounted. As shown, the high spool and shaft 32 includes a bearing 142 which supports the high pressure turbine 54 and the high spool 32 on an outer periphery of a shaft that rotates with the high pressure turbine 54. As can be appreciated, the "overhung" mount means that the bearing 142 is at an intermediate location on the spool including the shaft, the high pressure turbine 54, and the high pressure compressor 52. Stated another way, the bearing 142 is supported upstream of a point 501 where the shaft 32 connects to a hub 500 carrying turbine rotors associated with the high pressure turbine (second) turbine section 54. Notably, it would also be downstream of the combustor 56. Note that the bearing 142 can be positioned inside an annulus 503 formed by the shaft 32 and the hub assembly 500 so as to be between the shaft and the feature numbered 106 and it still would be an "overhung" configuration.

The forward end of the high spool 32 is supported by a bearing 110 at an outer periphery of the shaft 32. The bearings 110 and 142 are supported on static structure 108 associated with the overall engine casings arranged to form the core of the engine as is shown in FIG. 1. In addition, the shaft 30 is supported on a bearing 100 at a forward end. The bearing 100 is supported on static structure 102. A rear end of the shaft 30 is supported on a bearing 106 which is attached to static structure 104.

With this arrangement, there is no bearing support struts or other structure in the path of hot products of combustion passing downstream of the high pressure turbine 54, and no bearing compartment support struts in the path of the products of combustion as they flow across to the low pressure turbine 46.

As shown, there is no mid-turbine frame or bearings mounted in the area 402 between the turbine sections 54 and 46.

While this invention has been disclosed with reference to one embodiment, it should be understood that certain modifications would come within the scope of this invention. For that reason, the following claims should be studied to determine the true scope and content of this invention.

What is claimed is:

1. A gas turbine engine comprising:
 a fan including a plurality of fan blades, and an outer housing surrounding the fan to define a bypass flow path;
 a compressor section in fluid communication with the fan, the compressor section including a low pressure compressor and a high pressure compressor;
 a turbine section including a fan drive turbine and a high pressure turbine, wherein the fan drive turbine includes at least three stages, but no more than six stages, wherein the high pressure turbine has two stages, and wherein the low pressure compressor has a greater number of stages than the high pressure turbine;
 wherein the gas turbine engine is a two-spool engine including a low spool having an inner shaft and a high spool having an outer shaft that drives the high pressure compressor, the inner shaft being concentric with the outer shaft such that the inner and outer shafts are rotatable about an engine central longitudinal axis;
 a geared architecture including an epicyclic gear train, the epicyclic gear train between the fan and the inner shaft driven by the fan drive turbine such that the fan rotates at a lower speed than the fan drive turbine;
 wherein the outer shaft is supported on a first bearing in an overhung manner, including the first bearing mounted on an outer periphery of the outer shaft at a location that is upstream of a point where the outer shaft connects to a hub carrying turbine rotors associated with the high pressure turbine, and the location of the first bearing is downstream of the high pressure compressor relative to the engine central longitudinal axis;
 wherein the fan drive turbine has a first exit area at a first exit point and is rotatable at a first speed, and the high pressure turbine has a second exit area at a second exit point and is rotatable at a second speed, the second speed being faster than the first speed; and
 wherein a first performance quantity is defined as the product of the first speed squared and the first exit area, a second performance quantity is defined as the product of the second speed squared and the second exit area, and a performance ratio of the first performance quantity to the second performance quantity is between 0.8 and 1.5.

2. The gas turbine engine as set forth in claim 1, further comprising a low fan pressure ratio of less than 1.45 measured across the fan blades alone at a cruise condition at 0.8 Mach and 35,000 feet.

3. The gas turbine engine as set forth in claim 2, wherein the performance ratio is above or equal to 1.0.

4. The gas turbine engine as set forth in claim 3, wherein the fan has 26 or fewer fan blades.

5. The gas turbine engine as set forth in claim 4, wherein the geared architecture is a planetary gear system.

6. The gas turbine engine as set forth in claim 4, wherein the geared architecture is a star gear system.

7. The gas turbine engine as set forth in claim 1, wherein a rear end of the inner shaft is supported by a second bearing at a position downstream of the fan drive turbine.

8. The gas turbine engine as set forth in claim 7, wherein a forward end of the inner shaft is supported by a third bearing, and a forward end of the outer shaft is supported by a fourth bearing.

9. The gas turbine engine as set forth in claim 8, wherein the low pressure compressor is driven by the inner shaft, and the high pressure compressor is driven by the outer shaft.

10. The gas turbine engine as set forth in claim 9, wherein the fan drive turbine and the high pressure turbine are rotatable in opposed directions.

11. The gas turbine engine as set forth in claim 10, wherein there is no bearing support structure positioned intermediate the fan drive turbine and the high pressure turbine.

12. The gas turbine engine as set forth in claim 9, wherein the fan drive turbine and the low pressure compressor are rotatable in a first direction, and the high pressure turbine and the high pressure compressor are rotatable in a second direction opposed to the first direction.

13. The gas turbine engine as set forth in claim 12, wherein the geared architecture is a planetary gear system.

14. The gas turbine engine as set forth in claim 12, wherein the geared architecture is a star gear system.

15. The gas turbine engine as set forth in claim 14, wherein the fan is rotatable in the second direction.

16. The gas turbine engine as set forth in claim 15, wherein the performance ratio is above or equal to 1.0.

17. The gas turbine engine as set forth in claim 16, further comprising a low fan pressure ratio of less than 1.45 measured across the fan blades alone at a cruise condition at 0.8 Mach and 35,000 feet, and wherein the fan has fewer than 26 fan blades.

18. The gas turbine engine as set forth in claim 17, wherein the fan has a low corrected fan tip speed of less than 1150 ft/second.

19. The gas turbine engine as set forth in claim 18, wherein the performance ratio is greater than or equal to 1.075.

20. The gas turbine engine as set forth in claim 19, wherein there is no mid-turbine frame or bearings mounted intermediate the fan drive turbine and the high pressure turbine.

21. The gas turbine engine as set forth in claim 20, wherein the fan drive turbine is a three-stage turbine.

22. The gas turbine engine as set forth in claim 20, wherein the low pressure compressor has four stages.

23. The gas turbine engine as set forth in claim 20, wherein the fan drive turbine drives both the low pressure compressor and an input of the geared architecture.

24. The gas turbine engine as set forth in claim 23, wherein the outer shaft extends aft of the point relative to the engine central longitudinal axis.

25. The gas turbine engine as set forth in claim 23, wherein the low pressure compressor has a greater number of stages than the fan drive turbine.

26. The gas turbine engine as set forth in claim 25, wherein the low pressure compressor has four stages.

27. The gas turbine engine as set forth in claim 1, further comprising:
 a combustor section including a combustor between the compressor section and the turbine section; and
 wherein the location of the first bearing is downstream of the combustor relative to the engine central longitudinal axis.

* * * * *